United States Patent
Yoo et al.

(10) Patent No.: US 6,222,812 B1
(45) Date of Patent: *Apr. 24, 2001

(54) OPTICAL PICKUP USING AN OPTICAL PHASE PLATE

(75) Inventors: Jang Hoon Yoo; Chul Woo Lee, both of Seoul; Chong Sam Chung, Sungnam; Pyong Yong Seong, Seoul; Kun Ho Cho, Suwon; Hyun Seob Choi, Suwon; Yong Hoon Lee, Suwon; Tae Kyung Kim, Suwon; No Kyong Park, Suwon, all of (KR)

(73) Assignee: Samsung Electronics Co., Ltd., Kyungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,386

(22) Filed: Aug. 29, 1997

Related U.S. Application Data

(60) Provisional application No. 60/025,100, filed on Sep. 3, 1996.

Foreign Application Priority Data

Aug. 29, 1996 (KR) .................................................. 96-37946

(51) Int. Cl.$^7$ ........................................................ G11B 7/12
(52) U.S. Cl. ..................... 369/112; 369/44.37; 369/44.23
(58) Field of Search ................................... 369/109, 110, 369/112, 94, 58, 44.23, 44.24, 118, 103, 44.37

(56) References Cited

U.S. PATENT DOCUMENTS

| | | | |
|---|---|---|---|
| 5,303,221 | 4/1994 | Maeda et al. | 369/112 |
| 5,513,158 * | 4/1996 | Ohsato | 369/112 |
| 5,615,200 * | 3/1997 | Hoshino et al. | 369/112 |
| 5,638,353 * | 6/1997 | Takahashi | 369/112 |
| 5,659,533 * | 8/1997 | Chen et al. | 369/109 |
| 5,665,957 * | 9/1997 | Lee et al. | 369/112 |

(List continued on next page.)

FOREIGN PATENT DOCUMENTS

| | | |
|---|---|---|
| 0 587 297 | 3/1994 | (EP) . |
| 0 747 893 | 12/1996 | (EP) . |
| 0 803 867 | 10/1997 | (EP) . |
| 5-81698 | 4/1993 | (JP) . |
| 6-96466 | 4/1994 | (JP) . |
| 6-259804 | 9/1994 | (JP) . |
| 7-311969 | 11/1995 | (JP) . |
| 8-55363 | 2/1996 | (JP) . |
| 4-178931 | 6/1998 | (JP) . |

*Primary Examiner*—Muhammad Edun
(74) *Attorney, Agent, or Firm*—Sughrue, Mion, Zinn, Macpeak & Seas, PLLC

(57) ABSTRACT

An optical pickup apparatus having compatibility with a recodable compact disk (CD-R) and a digital video disk (DVD), which uses a wavelength of one of a first light beam and a second light beam according to the recording medium to be used. In the optical pickup apparatus, laser light sources emit a first light beam having a relatively shorter wavelength for the DVD and a second light beam having a longer wavelength for the CD-R, respectively. An objective lens has a predetermined focal length in accordance with the position of an information recording surface in the DVD. An optical path control unit controls the path of light beams so that the light beam emitted from one of the laser light sources is directed to the objective lens and the light output from the objective lens is directed to the optical detection unit. A phase shift unit which is located between the optical path control unit and the objective lens, shifts the phase of the second light proceeding from the optical path control unit to the objective lens, to thereby reduce the size of a beam spot which is formed on a position of the information recording surface in the CD-R.

29 Claims, 6 Drawing Sheets

U.S. PATENT DOCUMENTS

| | | | |
|---|---|---|---|
| 5,696,750 | * 12/1997 | Katayama | 369/112 |
| 5,703,856 | 12/1997 | Hayashi et al. | 369/54 |
| 5,703,862 | * 12/1997 | Lee et al. | 369/112 |
| 5,717,674 | * 2/1998 | Mori et al. | 369/112 |
| 5,734,637 | * 3/1998 | Ootaki et al. | 369/112 |
| 5,754,512 | * 5/1998 | Komma et al. | 369/112 |
| 5,768,242 | * 6/1998 | Juday | 369/103 |
| 5,815,293 | * 9/1998 | Komma et al. | 369/112 |

* cited by examiner

——— 650nm
- - - - 780nm

OPTICAL PICKUP USING AN OPTICAL PHASE PLATE

This application claims benefit of Provisional application Ser. No. 60/025,100 filed Sep. 3, 1996.

BACKGROUND OF THE INVENTION

The present invention relates to an optical pickup apparatus which can record information on and read information from a digital video disk (DVD) and a recordable compact disk (CD-R), respectively.

Recording media for recording and reading the information such as video, audio or data, are a disk, a card, or a tape. Among them, the disk type is chiefly used. Recently, in the field of the optical disk apparatus, a laser disk (LD), a compact disk (CD) and a digital video disk (DVD) have been developed. Such an optical disk includes a plastic or glass medium having a certain thickness along an axial direction to which light is incident, and a signal recording surface on which information is recorded and located on the plastic or glass medium.

So far, a high-density optical disk system enlarges a numerical aperture of an objective lens in order to increase a recording density, and uses a short wavelength light source of 635 nm or 650 nm. Accordingly, the high-density optical disk system can record or read signals on or from a digital video disk, and can also read signals from a CD. However, to be compatible with a recent type of a CD, that is, a recordable CD (CD-R), light having a wavelength of 780 nm should be used, due to the recording characteristic of the CD-R recording medium. As a result, using the light beam wavelengths of 780 nm and 650 nm in a single optical pickup becomes very important for compatibility of the DVD and the CD-R. A conventional optical pickup which is compatible with the DVD and the CD-R will be described below with reference to FIG. 1.

FIG. 1 shows an optical pickup using two laser diodes as light sources for a DVD and a CD-R and a single objective lens. The FIG. 1 optical pickup uses laser light having a wavelength of 635 nm when reproducing a DVD, and uses laser light having a wavelength of 780 nm when recording and reproducing a CD-R. Light having the 635 nm wavelength emitted from a laser diode light source 1 passes through a collimating lens 2 and a polarization beam splitter 3 and then goes to an interference filter type prism 4. Light having the 780 nm wavelength emitted from a laser diode light source 11 passes through a collimating lens 12, a beam splitter 13 and a converging lens 14 and then goes to the prism 4, which converges the light having the 780 nm wavelength. An optical system having such a structure is called a "finite optical system." The prism 4 transmits the light beam having a wavelength of 635 nm reflected from the polarization beam splitter 3, and reflects the light beam converged by the converging lens 14. As a result, the light beam from the light source 1 is incident to a quarter-wave plate 5 in the form of a parallel beam by the collimating lens 2, while the light from the light source 11 is incident to the quarter-wave plate 5 in the form of a divergent beam by the convergent lens 14 and the prism 4. The light transmitting through the quarter-wave plate 5 is incident to an objective lens 7.

The light of the 635 nm wavelength emitted from the light source 1 is focussed by an objective lens 7 on a signal recording surface in a DVD 8 having a thickness of 0.6 mm. Therefore, the light reflected from the signal recording surface of the DVD 8 contains information recorded on the signal recording surface. The reflected light transmits through the polarization beam splitter 3, and is then incident to a light detector 10 for detecting optical information.

If the finite optical system described above is not used, when the 780 nm wavelength light emitted from the light source 11 is focussed on a signal recording surface in the CD-R 9 having 1.2 mm thickness using the above-described objective lens 7, spherical aberration is generated due to a difference in thickness between the DVD 8 and the CD-R 9. In more detail, the spherical aberration is due to a fact that the distance between the signal recording surface of the CD-R 9 and the objective lens 7 is farther than that between the signal recording surface of the DVD 8 and the objective lens 7, along an optical axis. To reduce such a spherical aberration, a construction of a finite optical system including a convergent lens 14 is required. By using a variable aperture 6 to be described later with reference to FIG. 2, the 780 nm wavelength light forms an optimized beam spot on the signal recording surface of the CD-R 9. The 780 nm wavelength light reflected from the CD-R 9 is reflected by the prism 4 and then the beam splitter 13, so as to be detected in the light detector 15.

The variable aperture 6 of FIG. 1 has a thin film structure as shown in FIG. 2 which can selectively transmit the rays of the light incident to the region if not more than the numerical aperture (NA) of 0.6 which coincides with the diameter of the objective lens 7. That is, the variable aperture 6 is partitioned into two regions based on the NA of 0.45 with respect to an optical axis. Among the two regions, a first region 1 transmits both 635 nm and 780 nm wavelength light and a second region 2 totally transmits the 635 nm wavelength light and totally reflects the 780 nm wavelength light. The region 1 has the numerical aperture of 0.45 or below, and the region 2 is an outer region of the region 1 and is made by coating a dielectric thin film. The region 1 is comprised of a quartz ($SiO_2$) thin film in order to remove any optical aberration generated by the dielectric thin film coated region 2. By using the variable aperture 6, the 780 nm wavelength light transmitting the region 1 having the 0.45 NA or below forms a beam spot appropriate to the CD-R 9 on the signal recording surface thereof. Thus, the FIG. 1 optical pickup uses an optimum light spot when a disk mode is changed from the DVD 8 to the CD-R 9. Accordingly, the FIG. 1 optical pickup is compatible for use with the CD-R.

However, the FIG. 1 optical pickup as described above should form a "finite optical system" with respect to the 780 nm wavelength light in order to remove any spherical aberration generated when changing a DVD compatibly with a CD-R. Also, due to the optical thin film, that is, the dielectric thin film, which is formed in the region 2 having the NA of 0.45 or above, an optical path difference between the light transmitting the region 1 having the NA of 0.45 or below and that transmitting the region 2 having the NA of 0.45 or above, is generated. To eradicate this difference, it is necessary to form an optical thin film in the region 1. Due to this reason, a quartz coating is formed in the region 1 and a multi-layer thin film is formed in the region 2. However, such a fabricating process does not become only complicated but also adjustment of the thickness of the thin film should be performed precisely in units of "$\mu$m." Thus, it has been difficult in mass-producing the optical pickup.

SUMMARY OF THE INVENTION

An object of the present invention is to provide an optical pickup apparatus which is compatible with a digital video disk and a recordable compact disk by removing a spherical aberration using a phase plate.

To accomplish the above object of the present invention, there is provided an optical pickup apparatus for at least two optical recording media, which are different in distance from an optical pickup to information recording surfaces and uses light beams of different wavelengths for recoding and reading information, the optical pickup apparatus comprising:

a plurality of laser light sources for emitting a first light beam having a relatively shorter wavelength and a second light beam having a relatively longer wavelength, respectively;

an objective lens having a predetermined focal length in which the focal point of the objective lens according to the first light beam coincides with the position of the information recording surface in a first optical recording medium having the information recording surface closer to the objective lens;

optical detection means;

means for controlling an optical path so that the light beam emitted from the laser light sources is directed to the objective lens and the light output from the objective lens is directed to the optical detection means; and phase shift means, coupled between the optical path control means and the objective lens, for shifting the phase of the second light beam proceeding from the optical path control means to the objective lens, thereby reducing the size of a beam spot which is formed on the position of information recording surface in the second optical recording medium having the information recording surface farther from the objective lens by the second light beam focussed by the objective lens, wherein a wavelength of one of the first light and second light beams is used according to the optical recording medium used.

BRIEF DESCRIPTION OF THE DRAWINGS

The preferred embodiments are described with reference to the drawings wherein.

DETAILED DESCRIPTION OF THE PREFERRED EMBODIMENTS

Preferred embodiments of the present invention will be described below in more detail with reference to the accompanying drawings.

Figure 1:
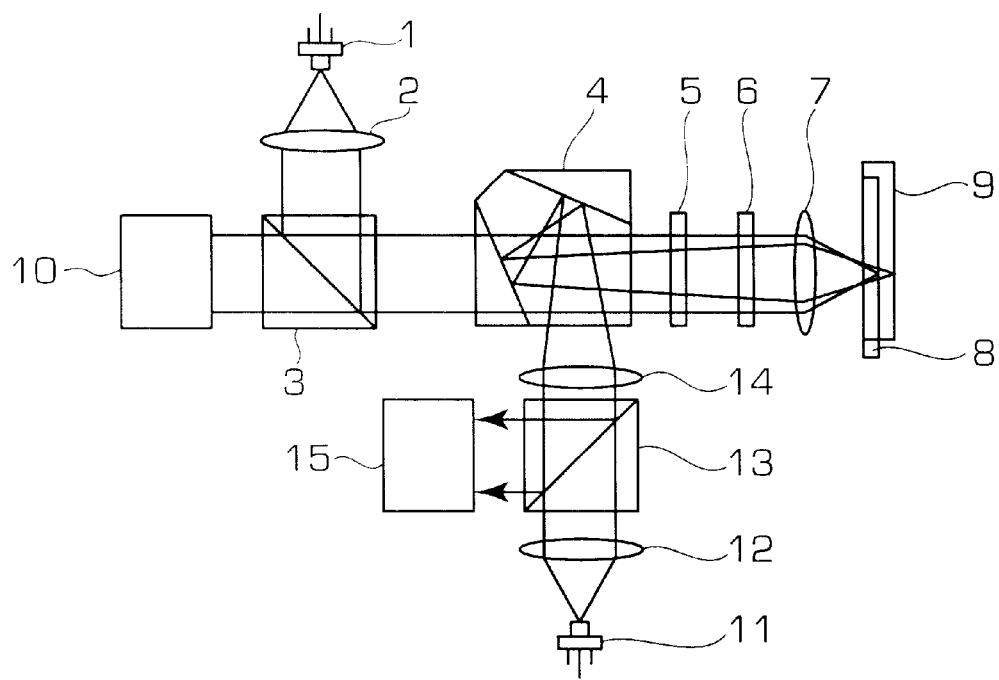
FIG. 1 is a view of an conventional optical pickup using two laser diodes as light sources for a digital video disk (DVD) and a recordable compact disk (CD-R) and a single objective lens.
Figure 2:
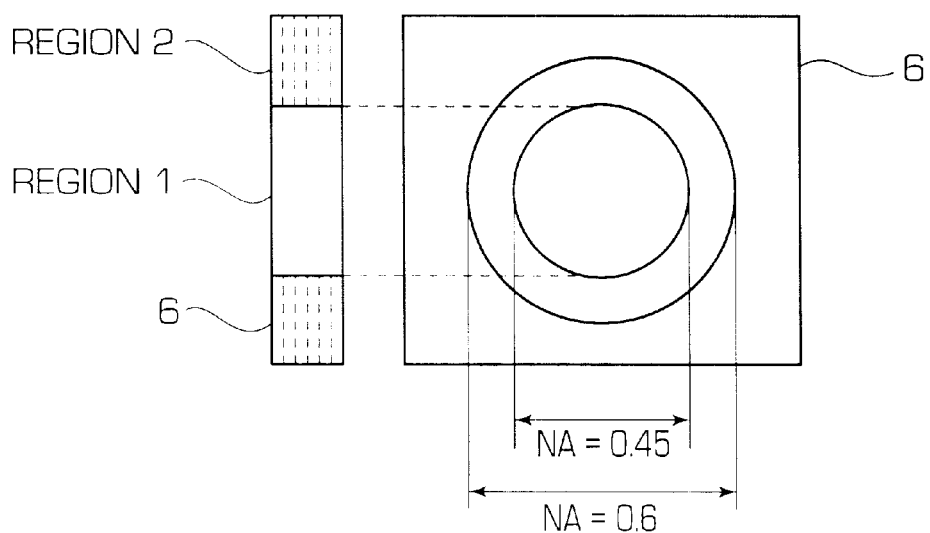
FIG. 2 is a view for explaining a variable aperture shown in FIG. 1.
Figure 3:
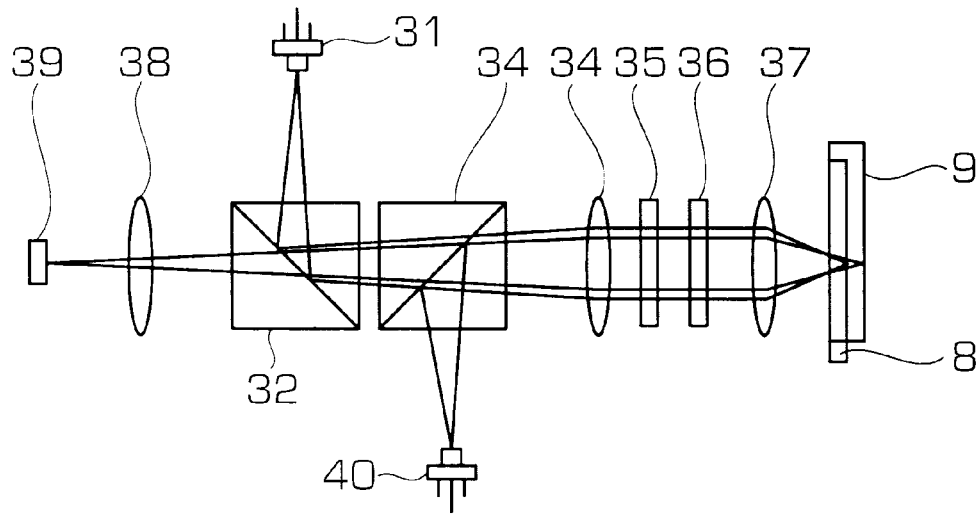
FIG. 3 is a view showing an optical system of an optical pickup according to a preferred embodiment of the present invention.

FIG. 3 shows an optical system of an optical pickup according to a preferred embodiment of the present invention. Referring to FIG. 3, when a laser diode light source 31 operates, the 650 nm wavelength light emitted in the divergent form from the light source 31 is sequentially reflected and transmitted by a first polarization beam splitter 32 and a second polarization beam splitter 33. The light transmitted by the second polarization beam splitter 33 is incident to a collimating lens 34. When a laser diode light source 40 operates, the 780 nm wavelength light emitted in the divergent form from the light source 40 is reflected by the second polarization beam splitter 33 and then, is incident to the collimating lens 34. The collimating lens 34 collimates the light beam incident from the second polarization beam splitter 33 to be parallel to an optical axis perpendicular to the surface of a variable aperture 35, and the collimated light is selectively transmitted by wavelength by the variable aperture 35.

Figure 7A:
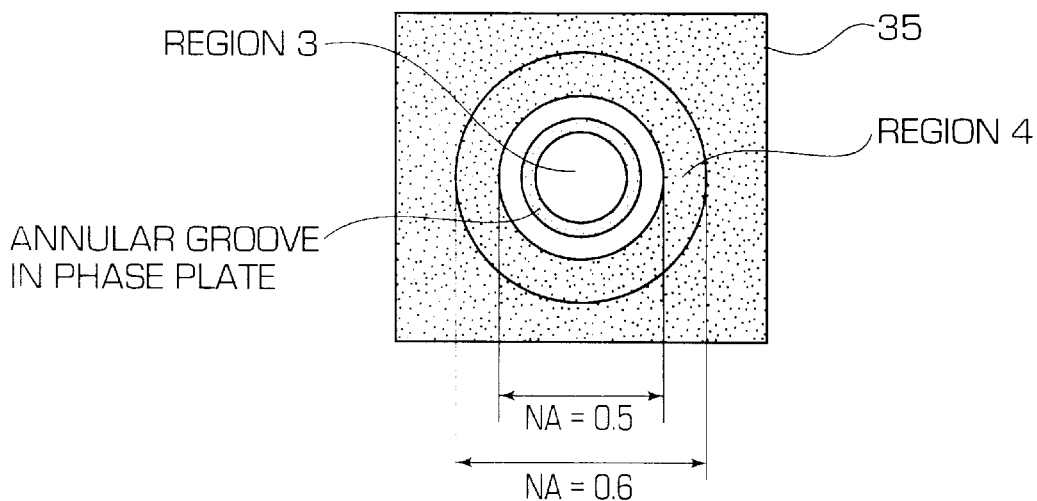
FIGS. 7A and 7B are views showing the combined structure of a phase plate and a variable aperture according to the present invention.
Figure 7B:
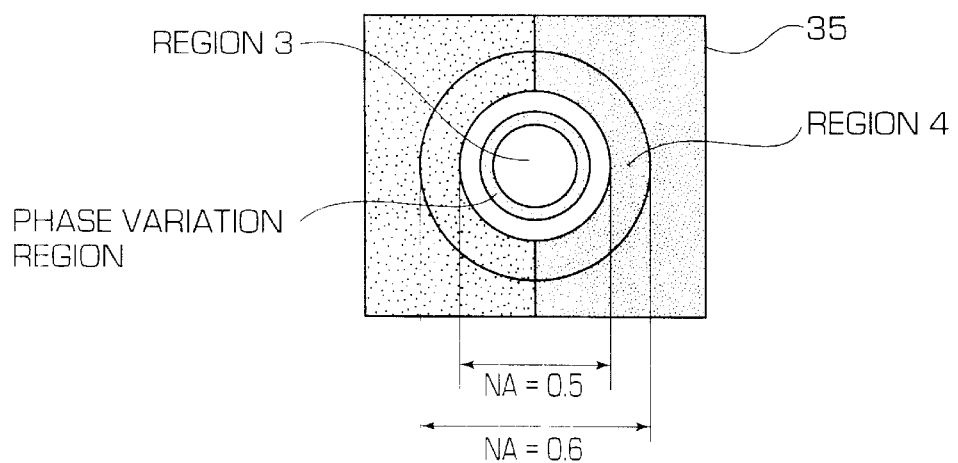
Figure 11:
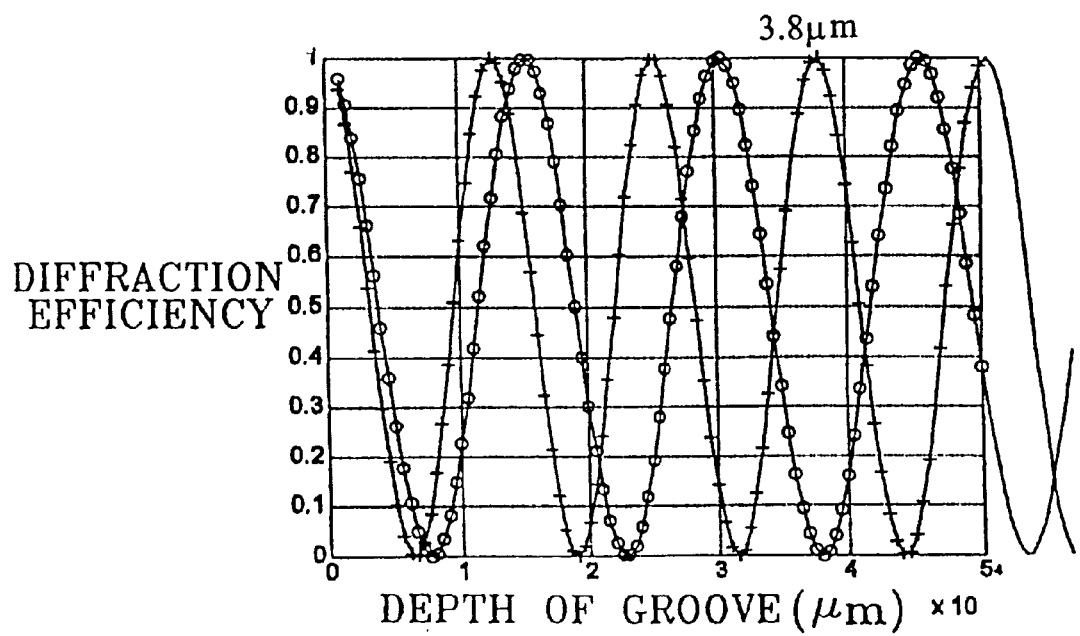
FIG. 11 is a graphical diagram showing variation of diffraction efficiency of zero-order diffracted light corresponding to the groove depth of the variable aperture according to the present invention.

Referring to FIGS. 7A and 7B, the variable aperture 35 has a region 3 for transmitting both the 780 nm wavelength light and the 650 nm wavelength light and a region 4 for transmitting only the 650 nm wavelength light. The region 4 has a hologram structure. The hologram structure includes a diffraction grating portion whose diffraction efficiency is maximized with respect to the 780 nm wavelength light having a diffraction order of non-zero and whose diffraction efficiency is 100% with respect to the 650 nm wavelength light having the diffraction order of zero. Therefore, the 650 nm wavelength light can be transmitted without diffraction by the hologram structure. Referring to FIG. 11 showing the diffraction efficiency of zero-order diffracted light corresponding to the groove depth of the diffraction grating portion, when the groove depth is 3.8 μm, the 650 nm wavelength light has the diffraction efficiency of 100% as shown in a solid line overlapped with the symbol "++", and the 780 nm wavelength light has the diffraction efficiency of 0% as shown in a solid line overlapped with a circle. Therefore, the region 4 of the variable aperture 35 is designed with the diffraction grating portion having a groove depth of 3.8 μm. In this embodiment, a NA of 0.5 is used for partitioning the regions 3 and 4. Therefore, the region 3 is the portion having a NA of 0.5 or below, and the region 4 is a portion having a NA more than 0.5. Thus, according to the embodiment of the present invention, the light beam transmitting the portion having a NA not more than 0.6 coinciding with the diameter of the objective lens 37 is selectively transmitted in the regions 3 and 4 of the variable aperture 35 according to the wavelengths. The variable aperture shown in FIG. 7B which is constructed with a hologram pattern of an asymmetric shape, eradicates a feedback noise produced by the light proceeding to an optical detection portion.

The light beam transmitting the variable aperture 35 transmits through a phase plate 36 (to be described later with reference to FIG. 4), and then is incident to an annular shielding objective lens 37. The objective lens 37 according to the present invention is designed to be focussed on an information recording surface of the DVD 8. If the phase plate 36 of the present invention is not used, the size of the light spot formed in the information recording surface of the CD-R 9 becomes 1.8 μm or above when changing the disk currently in use from the DVD 8 to the CD-R 9. However, since the conventional size of the light spot which is used in the CD-R 9 is generally 1.4 μm, information cannot be recorded on or read from the CD-R 9 via a light spot having a size of 1.8 μm. Therefore, the present invention uses the phase plate 36 in order to reduce the size of the light spot so that information can be recorded or read on or from the CD-R 9.

The phase plate 36 is, as shown in FIG. 3, positioned between the variable aperture 35 and the objective lens 37. The phase plate 36 includes an annular groove 361 (see FIG. 4) which is concave inwards from the surface closer to the variable aperture 35 and has a predetermined width and depth. The annular groove 361 is manufactured by injection molding or conventional molding using an etch or metal mold, in which the depth D is determined by the following equations (1) and (2).

$$2\pi n'D/\lambda' - 2\pi D/\lambda' = (2m')\pi \quad (1)$$

$$2\pi nD/\lambda - 2\pi D/\lambda = (2m+1)\pi \quad (2)$$

Figure 10:
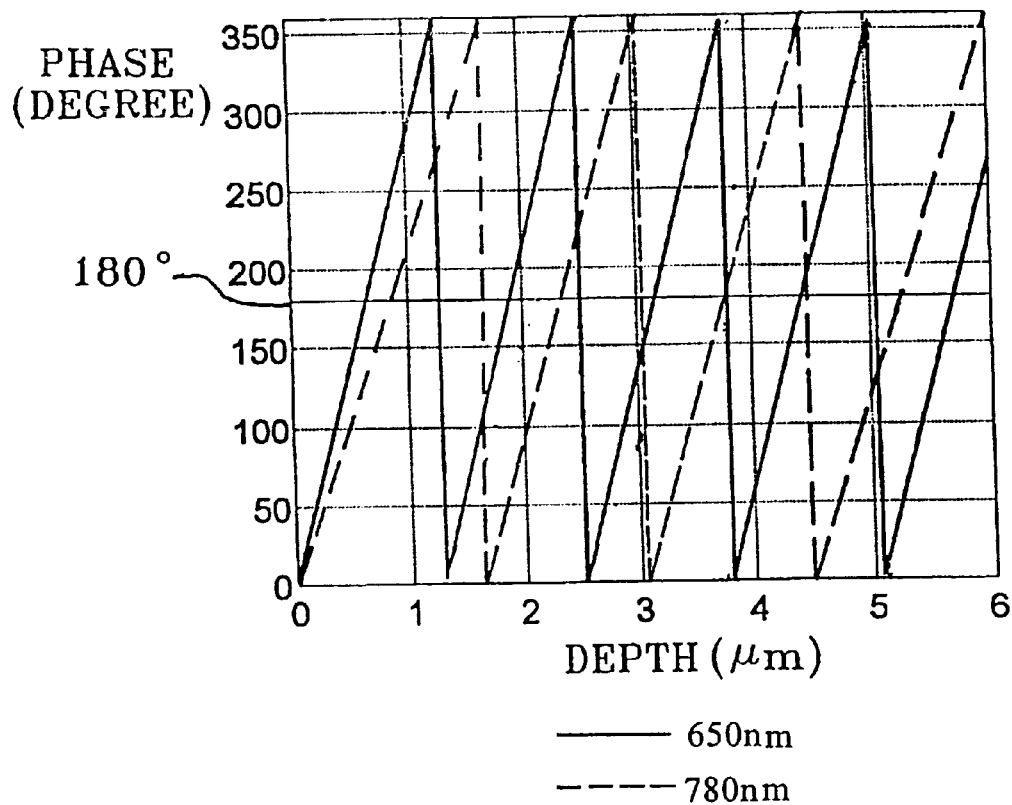
FIG. 10 is a graphical diagram showing phase variation of the light according to the depth of the groove on the phase plate.

Here, m is an integer, n' and n denote a refractive index at wavelength λ' (650 nm) and λ (780 nm), respectively. In the above equations (1) and (2), if m'=3 and m=2, the depth D of the annular groove 361 becomes about 3.9 μm. The phase plate 36 having the annular groove 361 of the depth D phase-shifts the 780 nm wavelength light by 180° and phase-shifts the 650 nm wavelength light by 360° when the two wavelengths proceed to the objective lens 37 from the variable aperture 35. FIG. 10 is a graphical diagram showing phase variation of the two wavelengths according to the depth D of the annular groove 361 on the phase plate 36, in which a solid line represents the phase variation with respect to the 650 nm wavelength light, and a dotted line represents that with respect to the 780 nm wavelength light. When D is 3.9 μm, the 780 nm wavelength light has the phase of 180° and the 650 nm light has the phase of 360°.

Thus, the 780 nm wavelength light which is phase-shifted by 180° has a substantially super-resolution effect and passes through an aperture compared with the case when the phase plate 36 is not used. By using the phase plate 36, the size of the light spot formed on the information recording surface in the CD-R 9 is reduced to a degree such that information can be recorded or read on or from the CD-R 9, to thereby remove any spherical aberration.

The phase plate 36 can be modified into a protrusion form having a predetermined width and height protruding outwards from the surface closer to the variable aperture 35. Since such a modification is apparent to one having an ordinary skill in the art who knows the function of the phase plate, the detailed description thereof will be omitted.

Figure 4:
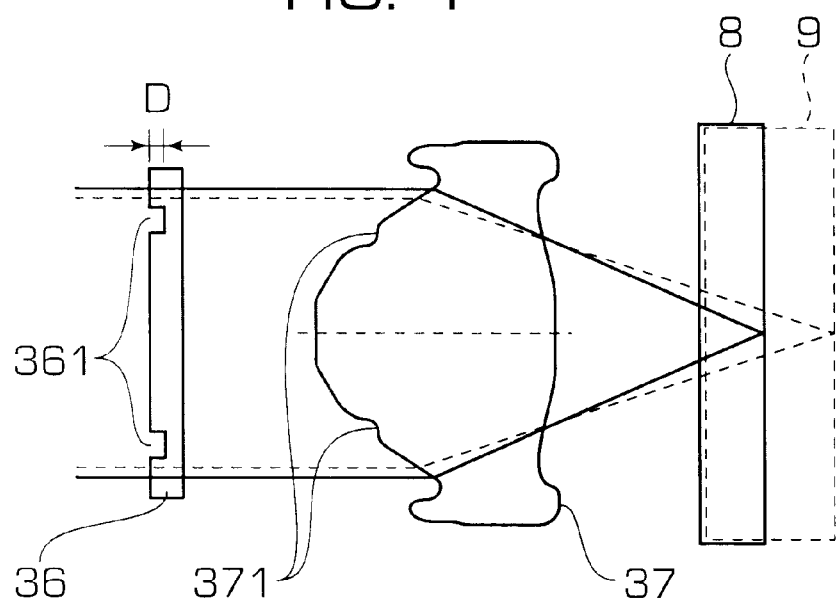
FIG. 4 shows a phase plate unit and an annular shield objective lens shown in FIG. 3.

The objective lens 37, to which the light transmitting the phase plate 36 is incident, includes an annular shielding portion 371 as shown in FIG. 4. The annular shielding portion 371 shields part of the light transmitting the region 3. Thus, the spherical aberration due to the changing of the DVD 8 to the CD-R 9 is reduced, and the sensitivity of the focus error signal in the focus servo system (not shown) is increased.

The light beam reflected from the information recording surface of the DVD 8 or CD-R 9 proceeds to a light detection lens 38 from the objective lens 37, and is focussed in the light detector 39 by the light detection lens 38. Thus, the FIG. 3 apparatus can record or read information on or from both the DVD 8 and CD-R 9.

Figure 5:
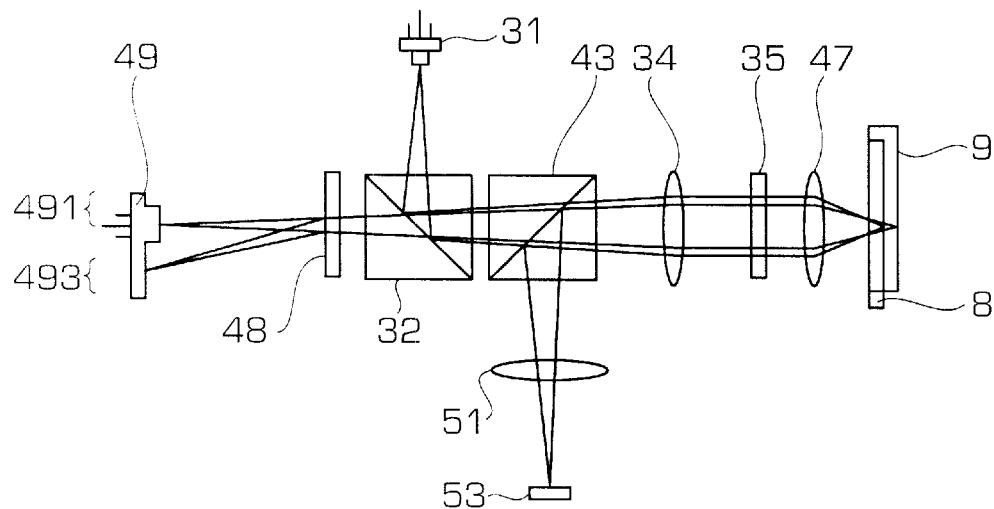
FIG. 5 is a view showing an optical system of an optical pickup according to another preferred embodiment of the present invention.
Figure 6:
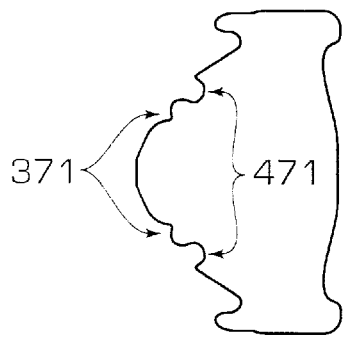
FIG. 6 shows an annular shield objective lens having a phase plate function as shown in FIG. 5.

FIG. 6 shows an objective lens 47 which is constructed by combining a phase plate 36 and an objective lens 37 of FIG. 3 into a single unit. FIG. 5 shows an optical system of an optical pickup having such an objective lens 47. The FIG. 6 objective lens 47 includes an annular groove 471 which is concave inwards from the surface closer to the variable aperture 35 and has a predetermined width and depth. The objective lens 47, which is engraved with such an annular groove 471, phase-shifts the 780 nm wavelength light by 180° as in the phase plate 36 and phase-shifts the 650 nm wavelength light by 360°. Thus, among the 780 nm wavelength light incident to the objective lens 47 from the variable aperture 35, the light beam diffracted by the annular groove 471 serves to decrease the spherical aberration with respect to the CD-R 9. The annular groove 471 removes the spherical aberration when the DVD 8 is exchanged with the CD-R 9. Accordingly, a beam spot of a small size is formed on the information recording surface so that information can be recorded or read on or from the CD-R 9 with respect to the 780 nm wavelength light. The FIG. 5 optical pickup includes a single unit 49 combining a light source 491 with a light detector 493 for the 780 nm wavelength light, in addition to a light source 31, a light detection lens 51 and a light detector 53 for the 650 nm wavelength light. The FIG. 5 optical pickup further includes a hologram type beam splitter 48 for the light output from the light source 491 of the unit 49 and the light incident to the light detector 493. Since the construction and operation of the FIG. 5 apparatus is apparent to a person skilled in the art who can fully understand the FIG. 3 apparatus through the above-described explanation, the detailed description thereof will be omitted.

The annular groove 471 formed in objective lens 47 as shown in FIG. 6 can be modified into a protrusion form which protrudes outwards from the surface of the objective lens 47 and has a predetermined width and depth.

FIGS. 7A and 7B are views showing a single structure combining a phase plate with a variable aperture according to the present invention. Referring to FIGS. 7A and 7B, a phase variation region contained in the region having a NA of 0.5 or below has a ring-shaped structure. Since the phase variation region performs the same function as that of the phase plate 36, the detailed description thereof will be omitted.

Figure 8:
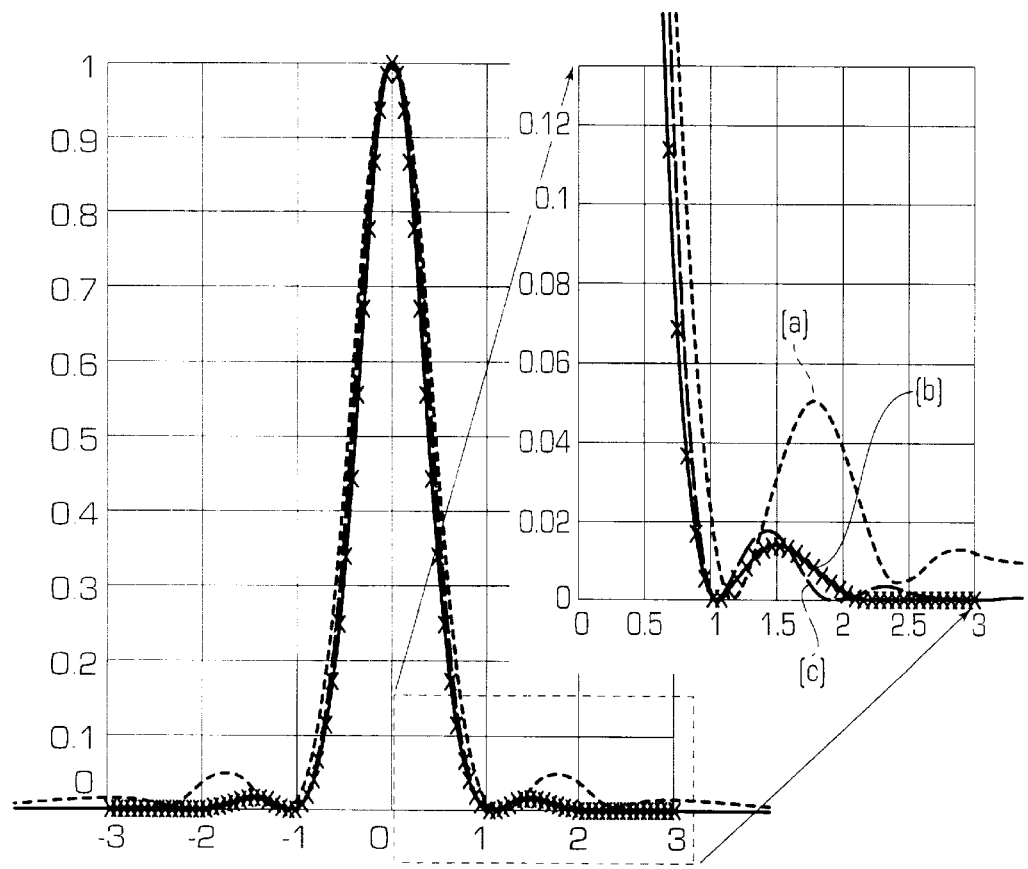
FIG. 8 is a graphical diagram showing reduction effect of a spot size and a side lobe according to the present invention.
Figure 9:
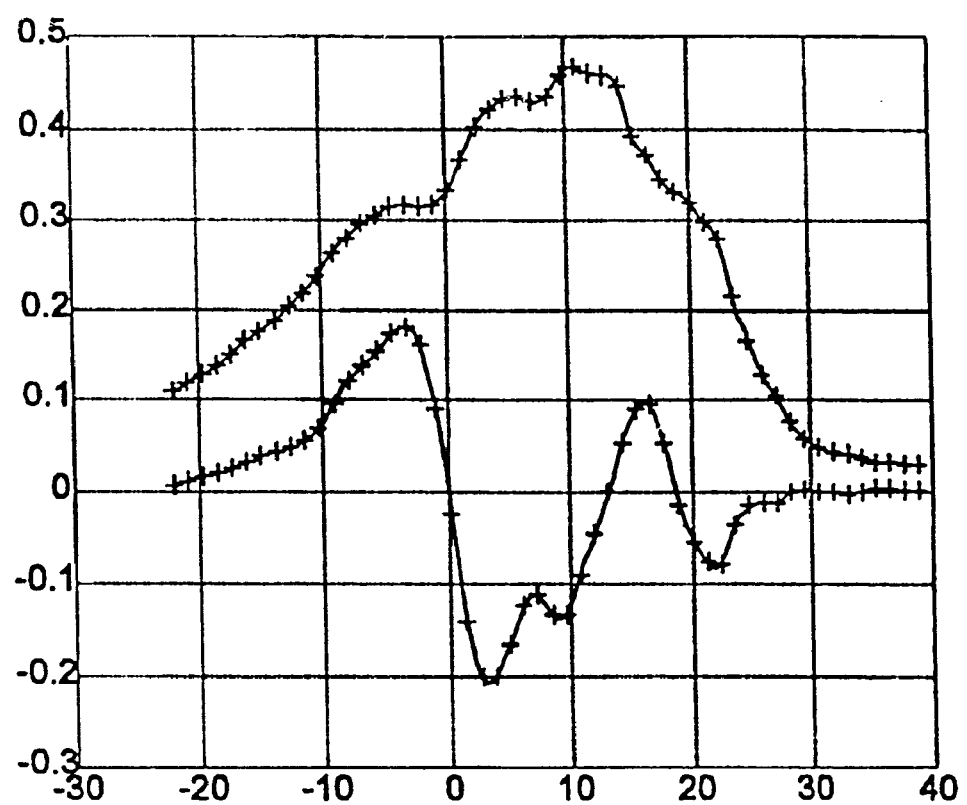
FIG. 9 is a graphical diagram showing characteristics of a focus servo signal during reproduction of a CD-R disk.

FIG. 8 is a graphical diagram showing a reduction efficiency of a spot size and a side lobe. In FIG. 8, a curve (a) indicates when a conventional optical pickup optimized for a DVD is used for a CD-R, in which the spot size formed in the information recording surface of the CD-R is 1.53 μm. A curve (b) indicates when an optical pickup apparatus according to the present invention is used, in which the spot size is 1.33 μm. A curve (c) indicates when an conventional optical pickup is used for a CD-R, in which the spot size is 1.41 μm. It can be seen from FIG. 8 that the optical pickup apparatus according to the present invention reduces the size of the spot by about 8% compared with the conventional optical pickup. Also, as the size of the side lobe is smaller at the time of the disk recording and reproduction, it can be seen that an amount of light in the peripheral portion of the spot which is called a side lobe, is reduced with respect to an optical pickup having a desirable optical characteristic. FIG. 9 shows that the optical pickup apparatus according to the present invention has an excellent characteristic with respect to a focus servo signal during reproduction of the CD-R, when the optical pickup apparatus detects an optical signal in the astigmatism manner, as shown by a relatively lower graph.

The above-described embodiments have been described with the structure including a variable aperture, a phase plate and an annular shield objective lens. However, using only a phase plate, the spherical aberration due to a disk exchange is reduced and an optical spot appropriate for the CD-R can be formed on the information recording surface.

The above-described embodiments have been described in connection with a infinite optical system which is made by the collimating lens 34. However, the present invention can be applied to a finite optical system which has no collimating lens located between a beam divider and an objective lens, as is apparent to one skilled in the art.

As described above, the optical pickup apparatus according to the present invention uses a phase plate. Accordingly, the present invention can provide an optical pickup which is used compatibly with a DVD and a CD-R with a single objective lens, without using a conventional optical apparatus which creates a problem in a manufacturing process.

While only certain embodiments of the invention have been specifically described herein, it will apparent that numerous modifications may be made thereto without departing from the spirit and scope of the invention.

What is claimed is:

1. An optical pickup apparatus for at least two optical recording media, which are different in distance from an optical pickup to an information recording surface and using light beams having different wavelengths for recording and reading information, the optical pickup apparatus comprising:

a plurality of laser light sources for emitting a first light beam having a relatively shorter wavelength and a second light beam having a relatively longer wavelength, respectively;

an objective lens having a predetermined focal length, in which a focal point of said objective lens according to the first light beam coincides with a position on the information recording surface in a first optical recording medium;

means for optical detection;

means for controlling an optical path so that at least one of the first and second light beams emitted from one of the laser light sources is directed to said objective lens and light output from said objective lens is directed to said optical detection means; and means for phase shifting, located between said optical path control means and said objective lens, for shifting the phase of a portion of the second light beam proceeding from said optical path control means to said objective lens, thereby reducing a size of a beam spot which is formed on the position of the information recording surface in the second optical recording medium by the second light beam focussed with said objective lens, wherein the wavelength of one of the first and second light beams is chosen according to the optical recording medium to be used.

2. The optical pickup apparatus according to claim 1, wherein said phase shift means is a phase plate including two regions which have different thicknesses from a surface of said phase plate which is disposed relatively farther from said optical path control means.

3. The optical pickup apparatus according to claim 2, wherein a region of said two regions which has a thin thickness of said phase plate is a portion for shifting the phase of the portion of the second light beam, and includes a groove, having a predetermined width and depth which is concave inwards from the surface of said pahse plate relatively closer to said optical path control means.

4. The optical pickup apparatus according to claim 3, wherein said region having said thin thickness has a concentric and annular shape with respect to an optical axis of said objective lens.

5. The optical pickup apparatus according to claim 3, wherein said groove has an optical depth for phase-shifting the first light by a degree of 360 and phase-shifting the second light by a optimized value.

6. The optical pickup apparatus according to claim 2, wherein a region having a thick thickness of said phase plate is a portion for shifting the phase of the portion of the second light beam, and includes a protrusion having a predetermined width and height which is protruded outwards from the surface of said phase plate relatively closer to said optical path control means.

7. The optical pickup apparatus according to claim 6, wherein said region of thick thickness has a shape of concentric circles with respect to an optical axis of said objective lens.

8. The optical pickup apparatus according to claim 6, wherein said protrusion has an optical height for phase-shifting the first light beam by a degree of 360 and phase-shifting the second light beam by a optimized value.

9. The optical pickup apparatus according to claim 2, wherein said phase plate is fabricated by one of etching, injection and molding operations.

10. The optical pickup apparatus according to claim 1, wherein said phase shift means is fabricated by one of etching, injection and molding a groove having a predetermined width and depth, which is concave inwards/outwards from the surface of said objective lens relatively closer to said optical path control means.

11. The optical pickup apparatus according to claim 10, wherein said phase shift means has a same curvature as that of said objective lens and is to be coupled with a surface of said objective lens which is relatively closer to said optical path control means.

12. The optical pickup apparatus according to claim 1, wherein said phase shift means has a shape of a protrusion having a predetermined width and height, which is protruded outwards from the surface of said phase plate relatively closer to said optical path control means.

13. The optical pickup apparatus according to claim 1, wherein one of the first and second light beams is appropriately selected and other components are consistently used whenever one optical recording medium is changed to the other optical recording medium.

14. The optical pickup apparatus according to claim 1, wherein one of said laser light sources and said optical detection means are integrated as a single unit.

15. The optical pickup apparatus according to claim 1, further comprising means for varying an aperture which is located between said and said phase shift means, having a first region for transmitting both of the first and second light beams entered from said optical path control means and a second region for transmitting the second light beam entered therefrom, wherein the first and the second regions have a same optical axis as that of said objective lens.

16. The optical pickup apparatus according to claim 15, wherein the second region of said variable aperture means includes a diffraction grating pattern.

17. The optical pickup apparatus according to claim 15, wherein said phase shift means and said variable aperture means are constructed as a single unit in which said phase shift means is formed within the first region of said variable aperture means.

18. The optical pickup apparatus according to claim 15, wherein said objective lens comprises at least one annular shielding portion for shielding a part of light which is transmitted via the first region.

19. The optical pickup apparatus according to claim 18, wherein said phase shift means and said variable aperture means are constructed as a single unit in which said phase shift means is formed within the first region of said variable aperture means.

20. The optical pickup apparatus according to claim 1, the portion of the second light beam phase-shifted by said means for phase shifting, passes through a part of an optical surface of said objective lens which is relatively apart from an optical axis of said objective lens.

21. An optical pickup apparatus for at least two optical recording media, which are different in distance from an optical pickup to an information recording surface and using light beams having different wavelengths for recording and reading information, the optical pickup apparatus comprising:

a plurality of laser light sources for emitting a first light beam having a relatively shorter wavelength and a second light beam having a relatively longer wavelength, respectively;

an objective lens having a predetermined focal length, in which a focal point of said objective lens according to the first light beam coincides with a position on the information recording surface in a first optical recording medium wherein the information recording surface is closer to said objective lens;

means for optical detection;

means for controlling an optical path so that at least one of the first and second light beams emitted from one of the laser light sources is directed to said objective lens and light output from said objective lens is directed to said optical detection means; and means for phase shifting, located between said optical path control means and said objective lens, for shifting the phase of the second light beam proceeding from said optical path control means to said objective lens, thereby reducing a size of a beam spot which is formed on the position of the information recording surface in the second optical recording medium having the information recording surface which is positioned farther from said objective lens by the second light beam focussed with said objective lens, wherein the wavelength of one of the first and second light beams is chosen according to the optical recording medium to be used;

wherein said phase shift means is a phase plate including two regions which have different thicknesses from a surface of said phase plate which is disposed relatively farther from said optical path control means; and wherein said two regions include a region having a thin thickness of said phase plate is a portion for shifting the phase of the second light beam, and includes a groove, having a predetermined width and depth which is concave inwards from the surface of said phase plate relatively closer to said optical path control means; and wherein the depth D of said groove is determined by the equations:

$2\pi n'D/\lambda' - 2\pi D/\lambda' = (2m')\pi$, and $2\pi n D/\lambda - 2\pi D/\lambda = (2m+1)\pi$, wherein m is an integer, n' and n denote a refractive index at wavelength $\lambda'$ and $\lambda$, respectively, and $\lambda'$ is a wavelength of the first light beam and $\lambda$ is a wavelength of the second light beam.

22. An optical pickup apparatus for at least two optical recording media, which are different in distance from an optical pickup to an information recording surface and using light beams having different wavelengths for recording and reading information, the optical pickup apparatus comprising:

a plurality of laser light sources for emitting a first light beam having a relatively shorter wavelength and a second light beam having a relatively longer wavelength, respectively;

an objective lens having a predetermined focal length, in which a focal point of said objective lens according to the first light beam coincides with a position on the information recording surface in a first optical recording medium wherein the information recording surface is closer to said objective lens;

means for optical detection;

means for controlling an optical path so that at least one of the first and second light beams emitted from one of the laser light sources is directed to said objective lens and light output from said objective lens is directed to said optical detection means; and means for phase shifting, located between said optical path control means and said objective lens, for shifting the phase of the second light beam proceeding from said optical path control means to said objective lens, thereby reducing a size of a beam spot which is formed on the position of the information recording surface in the second optical recording medium having the information recording surface which is positioned farther from said objective lens by the second light beam focussed with said objective lens, wherein the wavelength of one of the first and second light beams is chosen according to the optical recording medium to be used;

wherein said phase shift means is fabricated by etching a groove having a predetermined width and depth, which is concave inwards from a surface of the objective lens relatively closer to said optical path control means; and wherein the depth of said groove is determined by the equations:

$2\pi n'D/\lambda' - 2\pi D/\lambda' = (2m')\pi$, and $2\pi n D/\lambda - 2\pi D/\lambda = (2m+1)\pi$, wherein m is an integer, n' and n denote a refractive index at wavelength $\lambda'$ and $\lambda$, respectively, and $\lambda'$ is a wavelength of the first light beam and $\lambda$ is a wavelength of the second light beam.

23. An optical pickup apparatus for at least two optical recording media, which are different in distance from an optical pickup to an information recording surface and using light beams having different wavelengths for recording and reading information, the optical pickup apparatus comprising:

a plurality of laser light sources for emitting a first light beam and a second light beam having different wavelengths, respectively;

an objective lens having a predetermined focal length, in which a focal point of said objective lens according to the first light beam coincides with a position on the information recording surface in a first optical recording medium, wherein said objective lens includes a groove having a predetermined width and depth for shifting a phase of a portion of the second light beam, thereby reducing a size of a beam spot which is formed on a position of the information recording surface on the second optical recording medium;

wherein said objective lens includes a groove having a predetermined width and depth for shifting a phase of a portion of the second light beam, thereby reducing a size of a beam spot which is formed on a position of the information recording surface on the second optical recording medium;

means for optical detection; and means for controlling an optical path so that at least one of the first and second light beams emitted from one of the laser light sources is directed to said objective lens and light output from said objective lens is directed to said optical detection means, wherein the wavelength of one of the first and second light beams is chosen according to the optical recording medium to be used.

24. An optical pickup apparatus for at least two optical recording media, which are different in distance from an optical pickup to an information recording surface and using light beams having different wavelengths for recording and reading information, the optical pickup apparatus comprising:

a plurality of laser light sources for emitting a first light beam and a second light beam having different wavelengths, respectively;

an objective lens having a predetermined focal length, in which a focal point of said objective lens according to the first light beam coincides with a position on the information recording surface in a first optical recording medium;

an optical detector for detecting light;

a variable aperture which controls an optical path so that at least one of the first and second light beams emitted from one of the laser light sources is directed to said objective lens and light output from said objective lens is directed to said optical detector and detected by said optical detector; and wherein said objective lens includes a groove having a predetermined width and depth, which is concave from the surface of said objective lens relatively closer to said variable aperture, said groove for shifting the phase of a portion of the second light beam proceeding from said variable aperture to said objective lens, thereby reducing a size of a beam spot which is formed on the position of the information recording surface in the second optical recording medium by the second light beam focussed with said objective lens, wherein the wavelength of one of the first and second light beams is chosen according to the optical recording medium to be used.

25. An optical pickup apparatus for at least two optical recording media, which are different in distance from an optical pickup to an information recording surface and using light beams having different wavelengths for recording and reading information, the optical pickup apparatus comprising:

a plurality of laser light sources for emitting a first light beam and a second light beam which having different wavelengths, respectively;

an objective lens including a phase shift region for shifting a phase of the second light beam, in which the phase shift region minimizes a spherical aberration with respect to at least one optical recording medium, and the phase shift region and an inner region thereof or an inner region except the phase shift region are used together irrespective of a plurality of optical recording media, thereby optimizing the size of a beam spot which is formed on a position of information recording surface;

means for optical detection; and means for controlling an optical path so that at least one of the first and second light beams emitted from one of the laser light sources is directed to said objective lens and light output from said objective lens is directed to said optical detection means, wherein the wavelength of one of the first and second light beams is chosen according to the optical recording medium to be used.

26. The optical pickup apparatus according to claim 25, wherein said objective lens includes the phase shift region having an annular groove which is in a shape of a concentric circle with respect to the optical axis of said objective lens, and an optical phase is optimized in order to satisfy a minimized aberration with respect to a plurality of the optical recording media.

27. An optical pickup apparatus for at least two optical recording media, which are different in distance from an optical pickup to an information recording surface and using light beams having different wavelengths for recording and reading information, the optical pickup apparatus comprising:

an objective lens including a phase shift region on one side in order to be compatible with said plurality of the optical recording media, in which said phase shift region minimizes a spherical aberration with respect to at least one optical recording medium, and said phase shift region and an inner region thereof or an inner region except the phase shift region are used together irrespective of a plurality of the optical recording media, thereby optimizing the size of a beam spot which is formed on a position of information recording surface.

28. The optical pickup apparatus according to claim 27, wherein said objective lens includes the phase shift region having an annular groove which is in a shape of a concentric circle with respect to the optical axis of said objective lens, and an optical phase is optimized in order to satisfy an minimized aberration with respect to a plurality of the optical recording media.

29. The optical pickup apparatus according to claim 28, further comprising:

at least one laser light source;

at least one optical detection means; and means for controlling an optical path so that at least one of the first and second light beams emitted from one of said laser light sources is directed to said objective lens and light output from said objective lens is directed to said optical detection means.

* * * * *